US006550743B2

(12) United States Patent
Rountree et al.

(10) Patent No.: US 6,550,743 B2
(45) Date of Patent: Apr. 22, 2003

(54) HYDRAULIC SYSTEM FOR ACTUATION OF A MEASUREMENT-WHILE-DRILLING MUD VALVE

(76) Inventors: Stephen P. Rountree, 101 Thornwood Cir., Lafayette, LA (US) 70503; Bradley J. Vincent, 127 Sugar Creek Rd., Youngsville, LA (US) 70592

(*) Notice: Subject to any disclaimer, the term of this patent is extended or adjusted under 35 U.S.C. 154(b) by 0 days.

(21) Appl. No.: 09/732,496

(22) Filed: Dec. 7, 2000

(65) Prior Publication Data

US 2002/0070368 A1 Jun. 13, 2002

(51) Int. Cl.$^{7}$ .............................................. F16K 31/383

(52) U.S. Cl. ....................... 251/30.01; 251/63; 251/117

(58) Field of Search ........................... 251/30.01, 30.03, 251/62, 63, 63.5, 117, 118, 324; 91/19, 357, 402

(56) References Cited

U.S. PATENT DOCUMENTS 2,882,685 A * 4/1959 Carlsen et al. ................ 60/375
3,502,002 A * 3/1970 Whiteman, Jr. .............. 60/533
3,655,315 A * 4/1972 Bopp ......................... 425/145
3,797,365 A * 3/1974 Yoshikawa ................... 91/402
4,266,606 A * 5/1981 Stone .................... 137/624.13
4,453,699 A * 6/1984 Hulsey et al. ......... 137/516.25
4,957,457 A * 9/1990 Probst et al. ............... 137/503
5,092,419 A * 3/1992 Leiber et al. ............... 180/414
5,284,083 A * 2/1994 Vaslin ......................... 60/406

* cited by examiner

*Primary Examiner*—Henry C. Yuen
*Assistant Examiner*—Patrick Buechner
(74) *Attorney, Agent, or Firm*—Joseph L. Lemoine, Jr.

(57) ABSTRACT

The hydraulic system for actuation of the mud valve of a measurement-while-drilling tool is characterized by a hydraulic actuator having a piston operatively connected to the mud valve of a measurement-while-drilling tool, which hydraulic actuator incorporates an internal by-pass which, cooperatively with movement of the piston, opens to unload hydraulic pressure from the system at either end of stroke of the piston. Return from the by-pass to the pump may be restricted so as to maintain some hydraulic pressure on the piston at end of stroke so as to prevent movement therefrom by external forces. The hydraulic system may include a high pressure relief valve, hydraulic fluid strainer and a device to equalize pressure between hydraulic system pressure and pressure external of the system.

24 Claims, 4 Drawing Sheets

HYDRAULIC SYSTEM FOR ACTUATION OF A MEASUREMENT-WHILE-DRILLING MUD VALVE

BACKGROUND OF THE INVENTION

1. Field of the Invention

The invention relates generally to measurement-while-drilling apparatus used in earth boring operations. In various measurement-while-drilling apparatus information about downhole conditions is telemetered to the surface of the bore by means of pressure changes ("mud pulses") in the drilling fluid ("mud") which is circulated through the drill sting and annulus of the bore during drilling. Such mud pulses are typically created by alternatively restricting and unrestricting the flow of mud through a downhole valve ("mud valve"). In various MWD systems actuation of the mud valve is accomplished through use of hydraulic system. The invention disclosed and claimed herein relates to an improved hydraulic system for actuation of an MWD mud valve.

2. Description of Related Art

In the field of earth boring, MWD apparatus are employed to obtain information about downhole conditions, such as wellbore inclination angle, magnetic heading, orientation of the bottom-hole assembly, formation radioactivity, resistivity and porosity without the necessity of interrupting drilling operations. To accomplish that end, MWD apparatus typically employ sensors located as close as practical to the drill bit, means to encode the sensed data into a pulse format, and means to telemetry the data pulses to the surface. A common means of telemetering such data to the surface is by causing back-pressure changes ("mud pulses") to occur in the drilling fluid ("mud") which is circulated during drilling. In such means at least a portion of said drilling fluid is flowed through a mud valve located downhole, which valve is alternatively actuated between two positions (alternatively "restricting" and "unrestricting" the flow of drilling fluid through the mud valve). This causes corresponding changes in back-pressure ("mud pulses") of the drilling fluid. These mud pulses may be detected at the surface of the bore and decoded to retrieve information about downhole conditions.

In certain forms of MWD apparatus, actuation of the mud valve is accomplished by means of a hydraulic system. U.S. Pat. Nos. 4,266,606, 3,756,076, 3,737,843 and 3,693,428 disclose hydraulic systems for operation of an MWD mud valve. In these patents the piston of the linear hydraulic actuator is operatively coupled to the poppet of a poppet-seat type mud valve. When hydraulic pressure is applied to one side of the piston, the piston moves to one end of the actuator which causes the poppet to move towards the seat of the mud valve. Reducing the gap between the poppet and seat causes back pressure of drilling fluid to increase. Alternatively, when hydraulic pressure is applied to the opposite side of the piston, the piston moves to the other end of the actuator, increasing the gap between the poppet and seat, causing back pressure of the drilling fluid to decrease. No means is provided in these patents to by-pass hydraulic fluid through the actuator after its piston has stroked a desired amount. Rather in operation, full hydraulic pressure is continuously applied to either one or the other side of the piston.

U.S. Pat. No. 6,050,349 discloses a hydraulic system for operating a hydraulic actuator of rotary configuration. When hydraulic pressure is applied to one side of a vane type piston, the piston rotably moves to the opposite side of the actuator and closes a mud valve port, causing back pressure of the drilling fluid to increase. When hydraulic pressure is applied to the opposite side of the actuator, reverse movement and effect occurs. Similar to the above patents, the actuator of this patent contains no means to by-pass hydraulic fluid through the actuator after piston has stroked in either direction. Rather during operation hydraulic pressure continuously loads either one or the other side of the piston, continuously loading the hydraulic system.

Continuous loading of the hydraulic system constitutes a source of heat which can be degrade performance of the hydraulic system or damage equipment, particularly in high temperature drilling conditions. The invention disclosed and claimed herein is directed toward this issue.

SUMMARY OF THE INVENTION

The invention features an improved hydraulic system for actuation of a measurement-while-drilling mud valve in which by-pass means provides for reduction of hydraulic load at a desired amount of actuator stroke. The hydraulic system includes a means for driving a hydraulic pump, a hydraulic pump, a valve for switching flow of hydraulic fluid between ports of a hydraulic actuator and a hydraulic actuator operatively coupled an MWD mud valve in which a by-pass means reduces hydraulic loading following a desired amount of actuator stroke. The system may include filtering or straining means, high pressure by-pass means, hydraulic reservoir and/or means to equalize the static pressure of the hydraulic system with the pressure of the surrounding environment.

DESCRIPTION OF THE PREFERRED EMBODIMENT

While the present invention will be described with reference to preferred embodiments, it will be understood by those skilled in the art that various changes may be made and equivalents may be substituted for elements thereof without departing from the scope of the invention. In addition, modifications may be made to adapt a particular situation or material to the teachings of the invention without departing from the essential scope thereof. It is therefore intended that the present invention not be limited to the particular embodiments disclosed herein, but that the invention will include all embodiments (and legal equivalents thereof) falling within the scope of the appended claims.

Figure 1B:
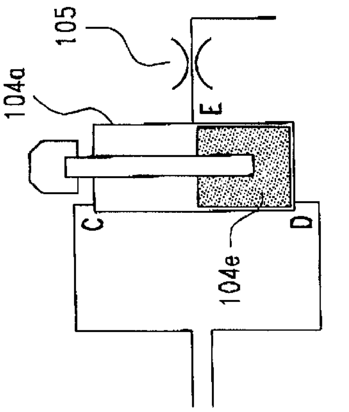
FIG. 1B is schematic representation of the same embodiment of the invention as is illustrated in FIG. 1A, but with the linear actuator in retracted position).
Figure 1A:
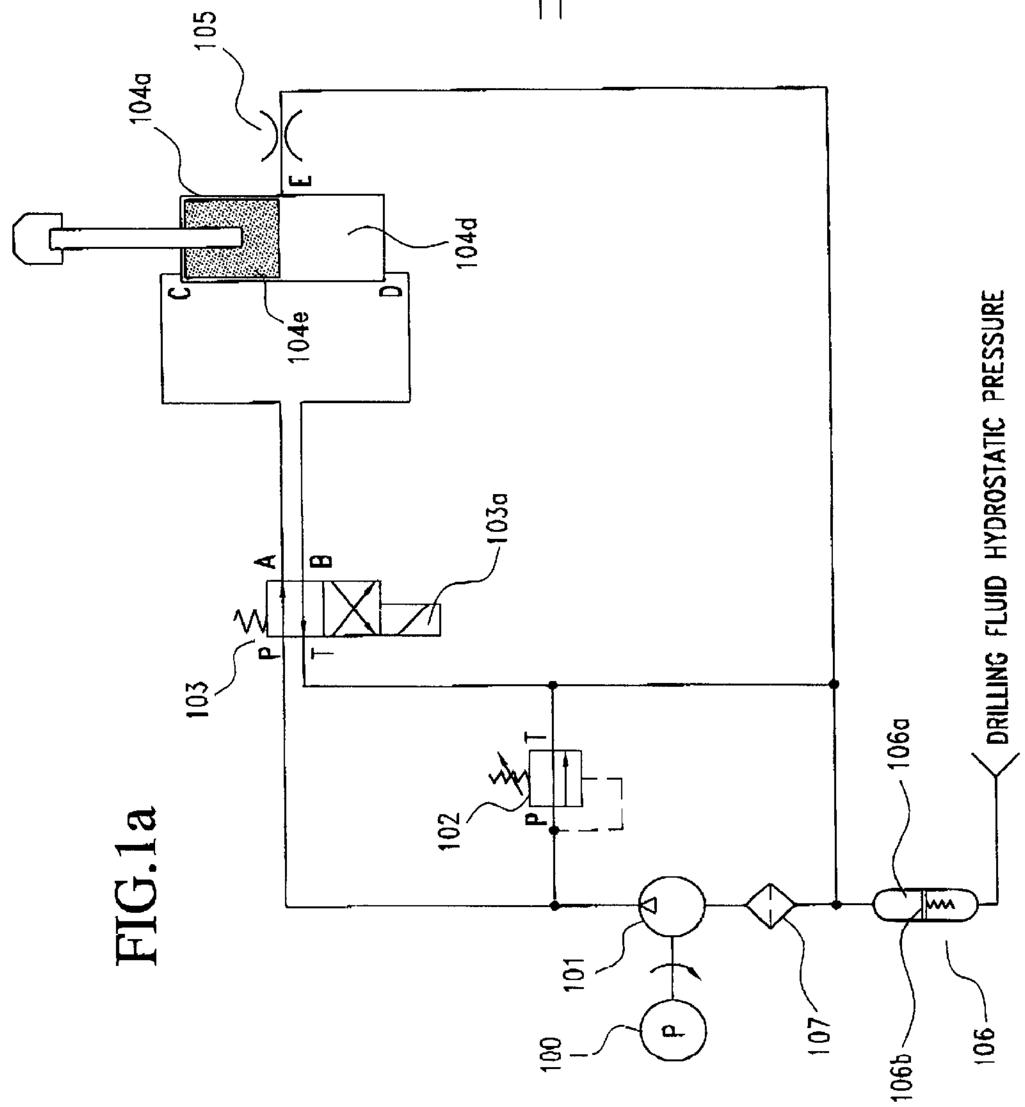
FIG. 1A is schematic representation of one embodiment of the hydraulic system of the present invention (showing a linear actuator in extended position).

FIG. 1(*a*) describes the hydraulic system of a preferred embodiment of the present invention. In FIG. 1(*a*) prime mover 100 drives hydraulic pump 101. In a preferred embodiment of the invention the prime mover 100 is a turbine driven by circulating drilling fluid ("mud turbine"), but it may be several other means such as electric motor, driven by battery or alternator, or various other suitable motive or power means.

The output of hydraulic pump 101 is hydraulically coupled to flow control valve 103. In a preferred embodiment of the invention flow control valve 103 is operated by solenoid 103(*a*) responsive to electrical signals representing encoded data, but may be operated by other suitable means, such as mechanical, pneumatic or hydraulic means in which data may be encoded.

In a preferred embodiment of the invention when flow control valve 103 is in one position, then fluid flow is from P to A and A into port C, urging piston 104(*e*) toward the opposite end (the "D end") of cylinder body 104(*a*). As piston 104(*e*) moves towards the D end of cylinder body 104(*a*), hydraulic fluid in cavity 104(*d*) flows from port D, through B and T, through strainer 107 and back to the inlet of pump 101. In a preferred embodiment of the invention the piston 104(*e*) is slightly less than one-half the desired stroke of the piston, and by-pass port E is positioned intermediate the ends of the stroke. Accordingly as the leading edge of piston 104(*e*) reaches a desired stroke towards the D end of cylinder body 104(*a*), its trailing edge clears port E, opening it to the passage of hydraulic fluid. When port E opens, a by-pass hydraulic loop is formed from the outlet of pump 101, through P, A, C, E, strainer 107 and back to the inlet of the pump 101, unloading the hydraulic system.

When flow control valve 103 is shifted to the other position, hydraulic pressure from pump 101 flows from port P to B and from B into port D, urging piston 104(*e*) toward the opposite end (the "C end") of cylinder body 104(*a*). As piston 104(*e*) begins travel to the C end of cylinder body 104(*a*), hydraulic fluid in cavity 104(*c*) is returned to the inlet of pump 101 through ports C, A and T. As piston 104(*e*) nears the end of its stroke toward the C end of cylinder body 104(*a*), the trailing end of the piston 104(*e*) again clears port E, again opening it, unloading the hydraulic system.

In the event it is desirable to maintain a residual pressure on piston 104(*e*) after it has stroked, such as may be the case where pressure forces of the drilling fluid or vibrational forces may cause undesired movement of piston 104(*e*), that may be accomplished by flow restrictor 105, by sizing port E down, by selecting small line size from port E to inlet of pump 101, by pressure limiting relief valve or other conventional means for maintaining back pressure in a fluid line.

Figure 2B:
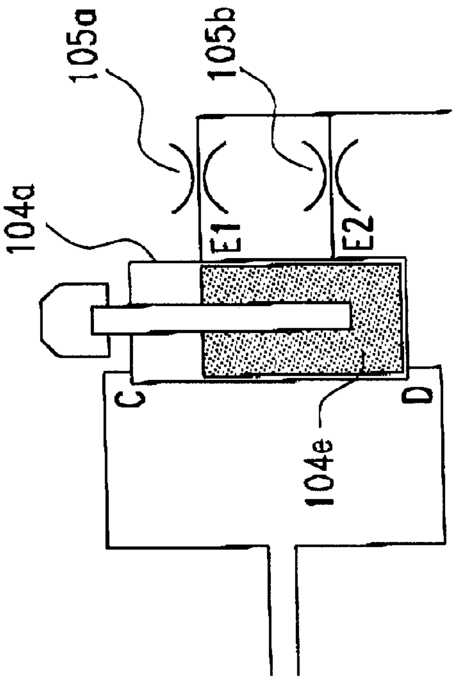
FIGS. 2A and 2B are schematic representations of an alternative embodiment of the hydraulic system of the present invention (showing a linear actuator having dual by-passes).
Figure 2A:
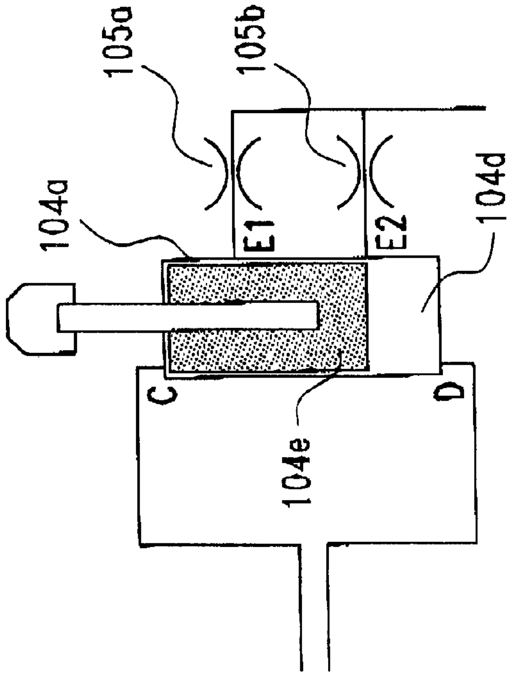

FIGS. 2A and 2B, illustrate an alternative embodiment of the invention in which port E is essentially bifurcated into two ports, E1 and E2, one of which unloads the hydraulic system when piston 104(*e*) has stroked in one direction and the other which unloads the hydraulic system when piston 104(*e*) is stroked in the other direction. By employing two by-pass ports as shown, each may be differently restricted, for example by flow restrictors 105*a* and 105*b*, to maintain a differing back-pressures on piston 104(*e*) depending on which direction it is stroked.

Figure 3B:
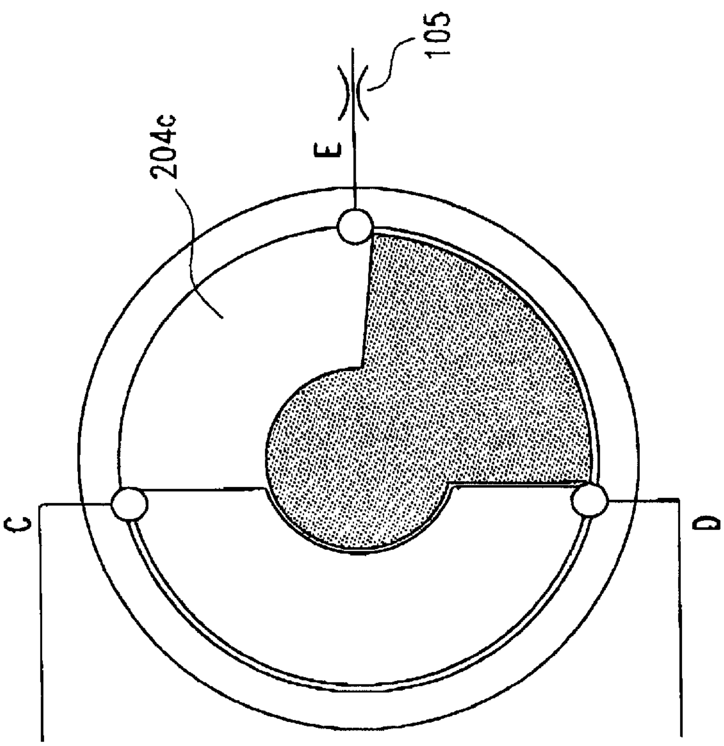
FIGS. 3A, 3B, 3C and 3D are schematic representations of an alternative rotary actuators of the present invention.
Figure 3A:
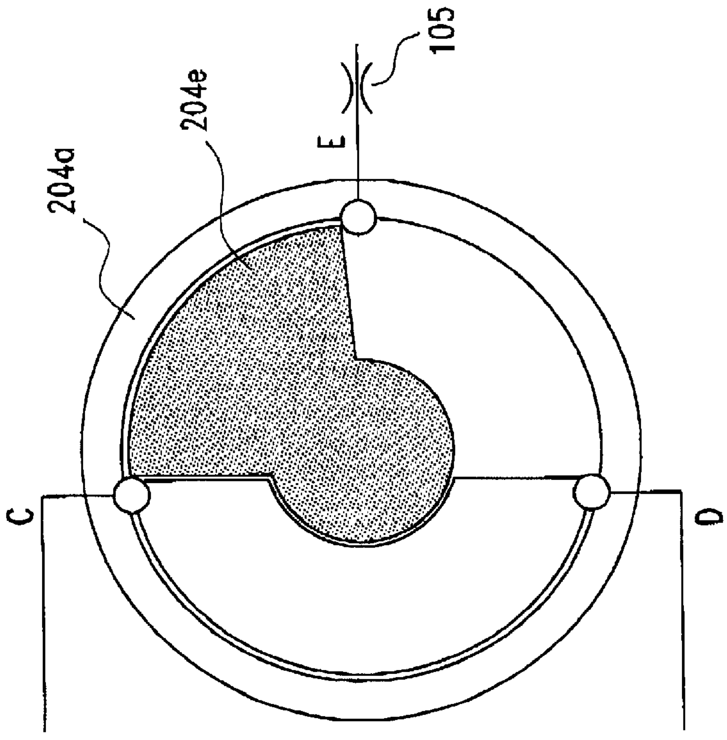
Figure 3D:
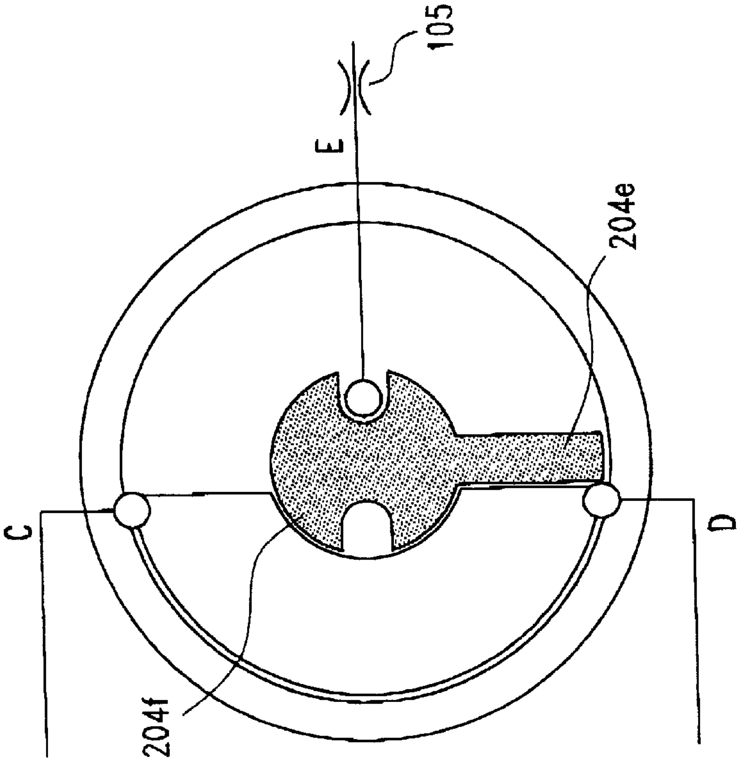
Figure 3C:
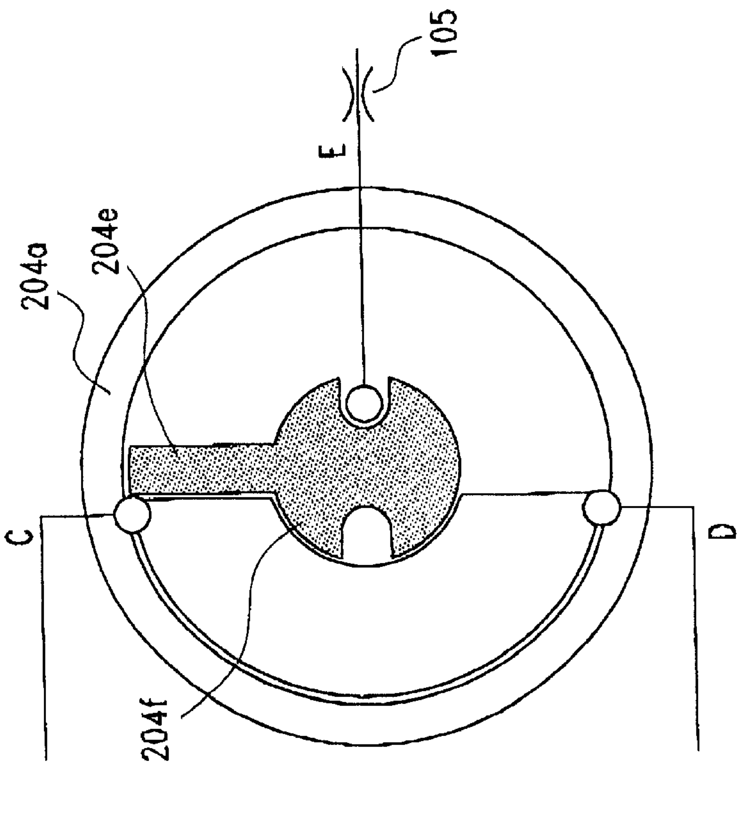

FIGS. 3A and 3B illustrate a rotary type mud valve actuator as may be employed in yet another preferred embodiment of the invention. With control valve 103 in one position hydraulic fluid flows to port C, urging rotary piston 204(*e*) towards the D end of cylinder housing 204(*a*). During initial movement of piston 204(*e*) from the C end toward the D end of the cylinder body 204(*a*), port E is covered by piston 204(*e*), closing port E. As the leading edge of the piston 204(*e*) nears the end of its stroke, its trailing edge clears port E, permitting hydraulic fluid to pass from C to E. When hydraulic fluid is directed to port D the reverse movement occurs. It will be understood by those skilled in the art that by increasing the chord of piston 204(*e*), port E could again be bifurcated into two ports, each of which may have separate flow restrictor 105 for maintaining differing residual pressures on piston 204(*e*) depending on which way it has stroked. FIGS. 3C and 3D are yet another preferred embodiment of a rotary type actuator which may be employed in the invention. In this embodiment plate 204(*f*), operatively coupled to a vane type piston, is employed to open port E upon desired stroke of the piston in either direction. It will be understood by those skilled in the art that stroke of the piston in any of the embodiments to the invention may be less than full length of cylinder body. It will also be appreciate by those skilled in the art that any of the ports of the present invention may consist of one or several openings.

Embodiments of the invention may also be equipped with pressure compensation means 106, strainer means 107 and high pressure relief means 102. Pressure compensation means 106, preferably includes hydraulic fluid reservoir 106(*a*) which is physically separated from, but in pressure communication with, drilling fluid pressure through pliable membrane, bellows, piston or the like of 106(*b*).

Strainer 107 may consist of any conventional means used to remove particulate material or cohesive masses from hydraulic fluid. It will be understood by those skilled in the art that in lieu of or in addition to strainer means in line with the inlet of the pump a filter means my be disposed in line with the outlet thereof.

Embodiments of the invention may also be equipped with high pressure by-pass means 102 to protect the system from damaging over-pressure in the event of malfunction of one or more other components of the system.

It is thus to be appreciated that a hydraulic system constructed in accordance with the principles and teachings of the present inventive disclosure constitutes an advancement in field of art to which the invention pertains. While the above description contains many specificities, these should not be construed as limitations on the scope of the invention, but rather as an exemplification of preferred embodiments thereof. Accordingly, the scope of the present invention should be determined not by the embodiments illustrated, but by the appended claims and their legal equivalents.

What is claimed is:

1. A hydraulic system for actuation of a mud valve of a measurement-while-drilling tool, comprising a hydraulic pump, a hydraulic actuator having a stroke and operatively coupled to the mud valve of a measurement-while-drilling tool, a valve for selectively directing hydraulic fluid from said pump to said hydraulic actuator; and, a hydraulic by-pass incorporated into said hydraulic actuator and operatively associated with the end of the stroke of said hydraulic actuator.

2. The hydraulic system of claim 1 wherein said hydraulic actuator is comprised of a cylinder body and a piston disposed therein having stroke along at least a portion of an interior wall of said cylinder body.

3. The hydraulic system of claim 2 wherein said by-pass means is comprised of at least one port disposed through said portion of said interior wall.

4. The hydraulic system of claim 3 wherein said by-pass means is comprised of a plurality of ports, at least two of which are disposed through said portion of said interior wall at different points along the stroke of said piston.

5. A hydraulic system for actuation of a mud valve of a measurement-while-drilling tool, comprising:

a hydraulic actuator having a first end, a second end, a distance between said first and second ends and a piston operatively connected to the mud valve of a measurement-while-drilling tool which is selectively movable within said actuator along a stroke which is at least a portion of the distance between said first end and said second end;

a by-pass port incorporated into said actuator which opens to by-pass hydraulic fluid through said hydraulic actuator at the end of the stroke of said piston towards the first end of said hydraulic actuator; and, a hydraulic valve for selectively directing hydraulic fluid to the second end of said hydraulic actuator.

6. The hydraulic system of claim 5 wherein said by-pass port is at least one fluid passage disposed intermediate the ends of the stroke of the piston.

7. The hydraulic system of claim 5 further comprising a hydraulic pump having an inlet and an outlet.

8. The hydraulic system of claim 7 further comprising a high pressure relief valve disposed between said inlet and outlet of said pump.

9. The hydraulic system of claim 7 wherein the outlet of said hydraulic pump is fluidly connected to said hydraulic valve.

10. The hydraulic system of claim 7 wherein said by-pass port is fluidly connected to the inlet of said hydraulic pump.

11. The hydraulic system of claim 9 further comprising a flow restrictor disposed between said by-pass port and the inlet of said hydraulic pump.

12. The hydraulic system of claim 9 further comprising a strainer disposed between said by-pass port and the inlet of said hydraulic pump.

13. The hydraulic system of claim 7 wherein both a flow restrictor and strainer are connected in series between said by-pass port and the inlet of said hydraulic pump.

14. The hydraulic system of claim 7 further comprising a pressure compensator disposed between the inlet of said hydraulic pump and pressure external the hydraulic system.

15. A hydraulic system for actuation of a mud valve of a measurement-while-drilling tool, comprising:

a hydraulic actuator having a first end, a second end, a distance between said first and second ends and a piston operatively connected to the mud valve of a measurement-while-drilling tool which is selectively movable within said actuator along a stroke which is at least a portion of the distance between said first end and said second end;

a by-pass port incorporated into said actuator which opens to by-pass hydraulic fluid through said hydraulic actuator at either end of the stroke of said piston; and, a hydraulic valve for selectively directing hydraulic fluid to the first or second end of said hydraulic actuator.

16. The hydraulic system of claim 15 wherein said by-pass port is at least one fluid passage disposed intermediate the ends of the stroke of the piston.

17. The hydraulic system of claim 15 further comprising a hydraulic pump having an inlet and an outlet.

18. The hydraulic system of claim 17 further comprising a high pressure relief valve disposed between said inlet and outlet of said pump.

19. The hydraulic system of claim 17 wherein the outlet of said hydraulic pump is fluidly connected to said hydraulic valve.

20. The hydraulic system of claim 17 wherein said by-pass port is fluidly connected to the inlet of said hydraulic pump.

21. The hydraulic system of claim 19 further comprising a flow restrictor disposed between said by-pass port and the inlet of said hydraulic pump.

22. The hydraulic system of claim 19 further comprising a strainer disposed between said by-pass port and the inlet of said hydraulic pump.

23. The hydraulic system of claim 17 wherein both a flow restrictor and strainer are connected in series between said by-pass port and the inlet of said hydraulic pump.

24. The hydraulic system of claim 17 further comprising a pressure compensator disposed between the inlet of said hydraulic pump and pressure external the hydraulic system.

* * * * *